(12) United States Patent
Williams

(10) Patent No.: US 8,368,921 B2
(45) Date of Patent: Feb. 5, 2013

(54) JDF PROCESSING IN A PRINTING SYSTEM

(75) Inventor: David A. Williams, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 1307 days.

(21) Appl. No.: 12/118,191

(22) Filed: May 9, 2008

(65) Prior Publication Data

US 2009/0279126 A1 Nov. 12, 2009

(51) Int. Cl.
*G06F 3/12* (2006.01)
(52) U.S. Cl. .................. 358/1.15; 358/1.18; 358/1.1
(58) Field of Classification Search ............. 358/1.15, 358/1.18, 1.1
See application file for complete search history.

(56) References Cited

U.S. PATENT DOCUMENTS

| 7,002,700 | B1 * | 2/2006 | Motamed .................. 358/1.1 |
| 2002/0095351 | A1 * | 7/2002 | Hitaka ..................... 705/26 |
| 2004/0066527 | A1 * | 4/2004 | Kloosterman et al. ....... 358/1.15 |
| 2005/0179921 | A1 | 8/2005 | Brossman et al. |
| 2006/0114493 | A1 | 6/2006 | Slightam et al. |
| 2006/0238803 | A1 * | 10/2006 | Kuroshima ................. 358/1.15 |

* cited by examiner

*Primary Examiner* — Benny Q Tieu
*Assistant Examiner* — Martin Mushambo
(74) *Attorney, Agent, or Firm* — Duft Bornsen & Fettig LLP

(57) ABSTRACT

Print controllers and associated methods of processing JDF job tickets in a printing system are disclosed. A print controller in one embodiment includes a storage system that receives a printable file from a host system, and stores the printable file. The print controller further comprises a JDF interpreter that receives a Job Definition Format (JDF) job ticket that is associated with the printable file from the host system. The JDF interpreter parses the JDF job ticket to identify printing parameters defined for the printable file. The JDF interpreter then issues device control commands for the printing parameters in the JDF job ticket. Thus, JDF job ticket processing is performed in the printing system instead of in the host system.

25 Claims, 6 Drawing Sheets

JDF PROCESSING IN A PRINTING SYSTEM

BACKGROUND

1. Field of the Invention

The invention relates to the field of printing systems, and in particular, to processing JDF job tickets in a printing system to identify printing parameters that define how to print files.

2. Discussion of Related Art

Printing systems generally include a localized print controller that connects to one or more host systems. The print controller controls the overall operation of the printing system including, for example, host interfacing, interpretation or rendering, and lower level process control or interface features of the print engines of the printing system. Host interaction may include appropriate adapters for coupling the printing system to one or more host systems that transmit printable files to the printing system. The printable files are generally encoded in the form of a page description language (PDL), such as PostScript (PS), PDF, PCL, PPML, etc.

In whatever form the printable files may be encoded or formatted, the print controller within the printing system interprets or renders the file to generate sheetside bitmaps of the file. For example, the printable file may include page descriptions for each page of the file that are written in a particular PDL. The print controller may then interpret the page descriptions for each page to generate the sheetside bitmaps for the file. The sheetside bitmaps represent the images to be printed on one side of a sheet of paper by a print engine. The print controller stores or buffers the sheetside bitmaps in accordance with storage capabilities of the particular print controller. The print controller then forwards the sheetside bitmaps to one or more print engines (also referred to as an imaging engine or as a marking engine). The print engine then performs an imaging process to mark the printable medium (e.g., a sheet of paper) with the sheetside bitmaps provided by the print controller. The print engine may comprise a laser print engine, an ink-jet print engine, or another type of imaging system that transfers each sheetside bitmap to corresponding pixels on paper.

In present printing systems, when the host system is instructed to print a particular file comprised of textual and graphical content, the host system converts the file into a printable file in one of a variety of PDLs. The host system also prepends printing parameters (also referred to as device control commands or instructions) to the printable file. For example, if the printable file is defined in PostScript, then an application running on the host system will access the Postscript Printer Description (PPD) file for the printer. The PPD file describes the fonts, paper sizes, resolution, and other capabilities that are standard for a particular Postscript printer. Based on the PPD file, a user selects one or more printing parameters for printing the printable file, such as n-up, 2-sided printing, etc, and the printing parameters are prepended to the PostScript file. The host system then transmits the PostScript file along with the printing parameters to the printing system, such as over a network. The print controller within the printing system then processes the printing parameters prepended to the PostScript file to identify how the printable file should be processed within the printing system.

One way of describing the printing parameters for a print job is through Job Definition Format (JDF). JDF is a standard for defining a print job, such as indicating one or more printable files for a print job, and defining printing parameters for printing these files. A JDF message is in XML format and describes a job ticket, a message description, and message interchange. A JDF message includes information that enables a device to determine what files are needed as input (if any), where the files are located, and what processes the device should perform. In present printing systems, processing of JDF messages, and more particularly JDF job tickets, is performed in the host system. In response to receiving or identifying a JDF job ticket, the host system processes the JDF job ticket to identify the printing parameters for a print job. The host system then generates a printable file in the appropriate PDL that includes the content intended for printing, and prepends the printing parameters to the printable file. This can cause problems as it may overload the host system in processing the JDF job ticket and generating the printable files, as the printable files and the prepended printing parameters can get quite large. Also, if a network connection is used between the host system and the printing system, then the large printable files may congest the network or unnecessarily use up network resources.

SUMMARY

Embodiments of the present invention solve the above and other related problems by processing JDF job tickets in a printing system instead of a host system. The printing system includes a print controller that has the appropriate processing capability. Thus, the host system may transmit a JDF job ticket and a printable file to the printing system for processing, instead of processing the JDF job ticket locally on the host system and prepending the printing parameters to the printable file. The print controller in the printing system then processes the JDF job ticket to identify the printing parameters defined in the job ticket, and controls printing of the printable file based on the identified printing parameters. The processing of JDF job tickets is advantageously moved from the host system to the printing system, which relieves the processing responsibility from the host system and avoids transmitting large files over a network.

One embodiment of the invention comprises a print controller in a printing system. The print controller comprises a storage system operable to receive a printable file from a host system, and to store the printable file. The print controller further comprises a JDF interpreter operable to receive a JDF job ticket that is associated with the printable file from the host system. The JDF interpreter is further operable to parse the JDF job ticket to identify printing parameters defined for the printable file. The JDF interpreter is further operable to issue device control commands for the printing parameters in the JDF job ticket to control the printing of the printable file.

The printing parameters may control different aspects of the printing processes performed on the file. For instance, the JDF interpreter may identify layout parameters defined in the JDF job ticket, and issue device control commands which control the layout of pages of the printable file. The JDF interpreter may identify rendering parameters defined in the JDF job ticket, and issue device control commands which control the rendering of pages of the printable file into bitmaps. The JDF interpreter may identify input media parameters defined in the JDF job ticket, and issue device control commands which control an input device to supply a printable medium indicated in the input media parameters to a print engine, where the print engine images bitmaps on the printable medium to generate printed sheets. The JDF interpreter may identify finishing parameters defined in the JDF job ticket, and issue device control commands which control a finishing device to perform a finishing process on the printed sheets to generate finished printed sheets. The JDF interpreter may identify output parameters defined in the JDF job ticket, and issue device control commands which control the output of the finished printed sheets to an output tray. The JDF interpreter may control other aspects of the printing process based on the printing parameters.

The invention may include other exemplary embodiments described below.

BRIEF DESCRIPTION OF THE DRAWINGS

The same reference number represents the same element or same type of element on all drawings.

DETAILED DESCRIPTION OF THE DRAWINGS

FIGS. 1-6 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
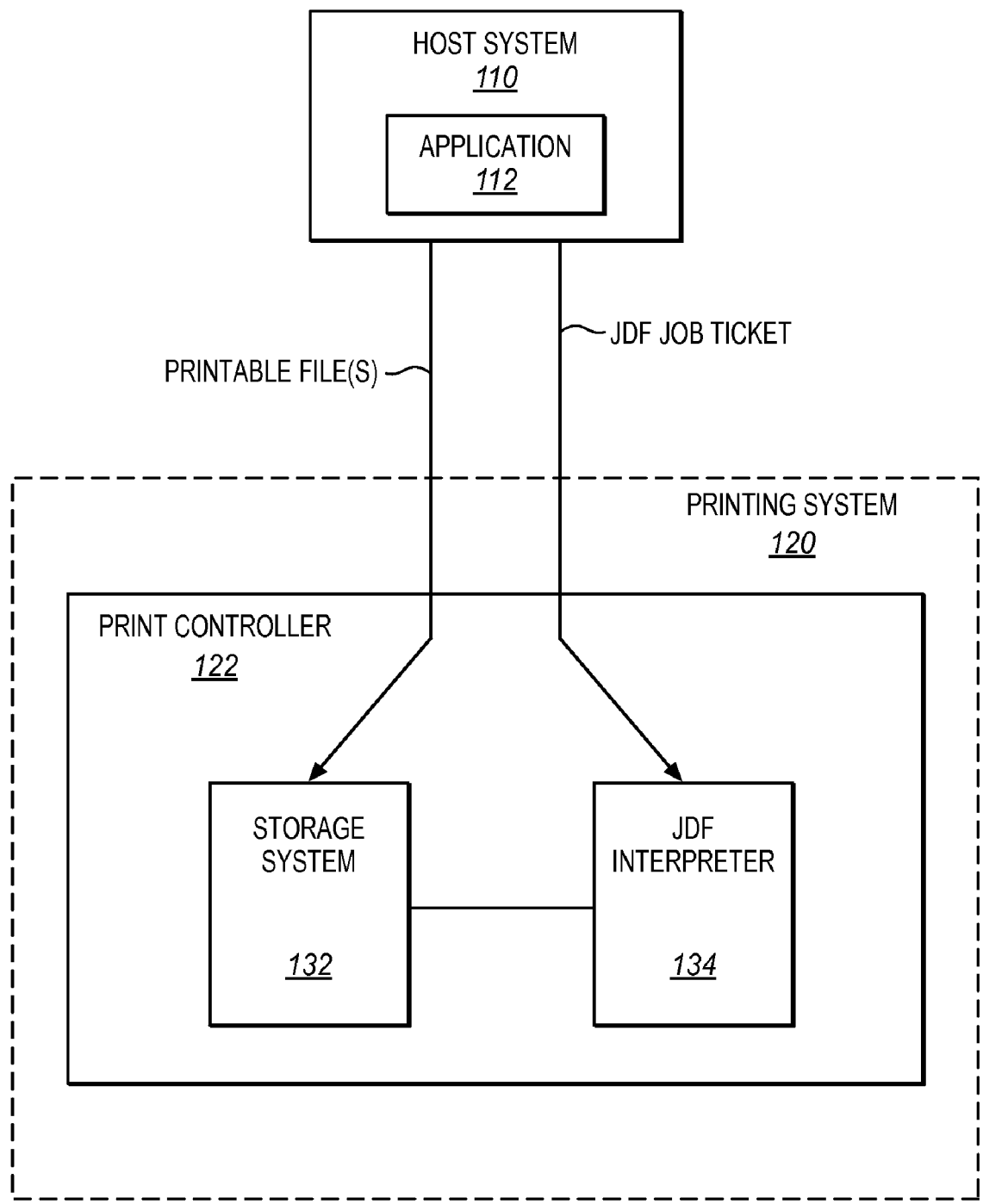
FIG. 1 illustrates a printing environment in an exemplary embodiment of the invention.

FIG. 1 illustrates a printing environment 100 in an exemplary embodiment of the invention. Printing environment 100 includes one or more host systems 110 in communication with a printing system 120. Host system 110 comprises any computer, server, or other device operable to execute an application 112 to generate or provide printable files. A printable file comprises any digital file having text, images, or other content to be printed on printing system 120. The printable files may be formatted in a variety of page description languages, such as PS, PDF, PCL, PPML, etc. Host system 110 may also generate or receive a JDF job ticket that is associated with a printable file. A JDF job ticket comprises any data that defines a print job for how a printable file is to be processed for printing, such as the type of input media to be used in printing a file, the size of pages in the file, alignment of graphics or text on the pages, the type of finishing for the pages, etc. When host system 110 submits a print job to printing system 120, host system 110 transmits the printable file and the JDF job ticket to printing system 120. Alternatively, the JDF job ticket may include an address or an indicator of the location of printable file, and printing system 120 may retrieve the printable file.

Printing system 120 comprises any system used to put marks on media. Printing system 120 may comprise a desktop printer or a floor-model printer adapted to print at a rate common for home or business-type operations, such as 30 pages per minute. Printing system 120 may also comprise a production printer (e.g., a continuous forms printer or a cut sheet page printer) adapted to print at higher volumes, such as 100 pages per minute or more. Printing system 120 includes a print controller 122. Print controller 122 comprises any system, server, or components operable to control the printing of files on printing system 120.

Print controller 122, in this embodiment, is operable to process JDF job tickets received from host system 110 or another system. To provide such functionality, print controller 122 includes a storage system 132 and a JDF interpreter 134. Storage system 132 comprises any system, server, or components operable to receive printable files for printing, and to store or queue the files. Storage system 132 may comprise a hard drive or other suitable storage means. JDF interpreter 134 comprises any system, server, or components operable to receive and process a JDF job ticket to determine how a printable file is to be processed on printing system 120. Although not shown, print controller 122 may include other components for processing raw data for a file, components for rendering or interpreting the raw data to generate bitmaps, and components for queuing or buffering the bitmaps for subsequent transfer to a print engine.

Figure 2:
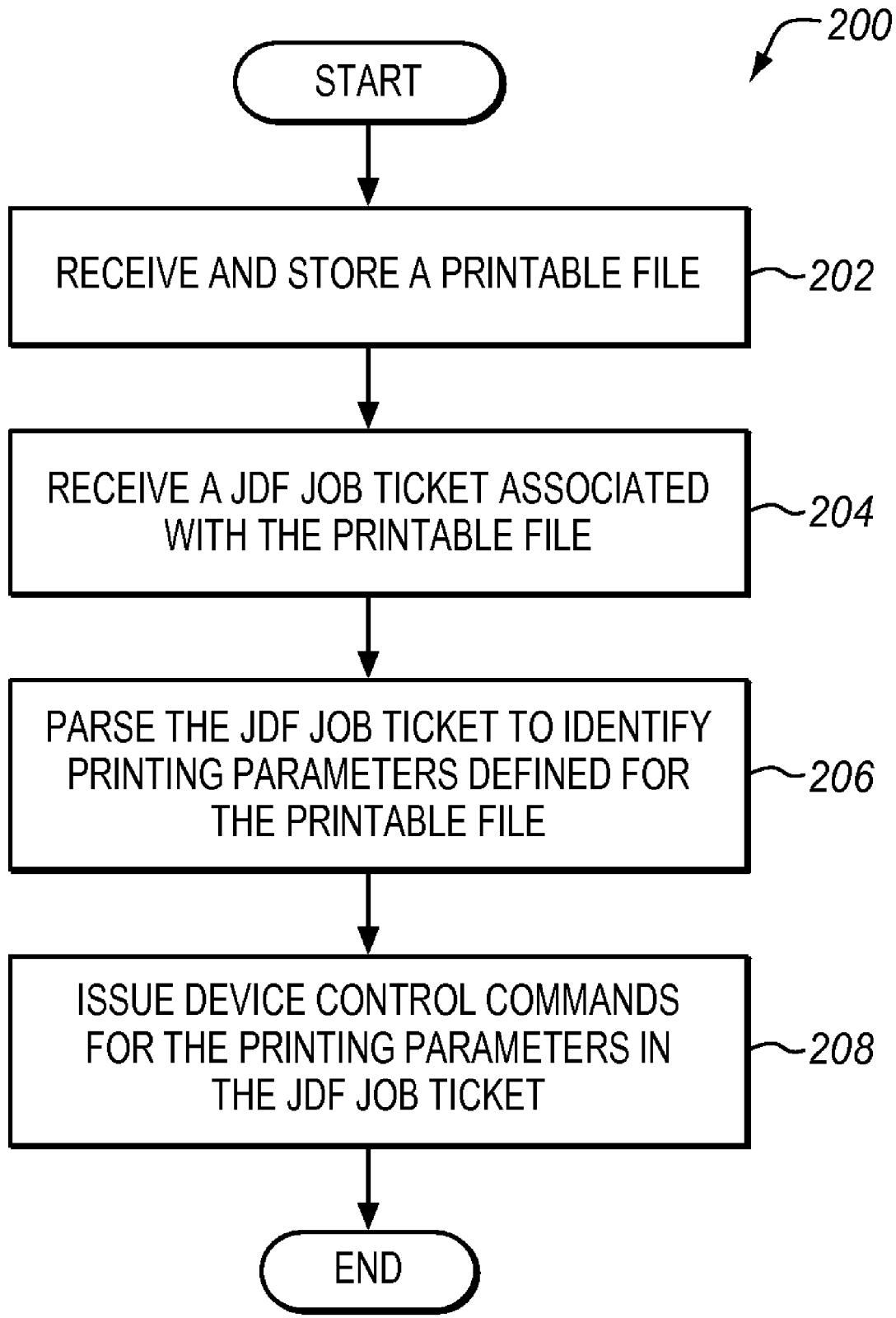
FIG. 2 is a flow chart illustrating a method of processing JDF job tickets in a printing system in an exemplary embodiment of the invention.

FIG. 2 is a flow chart illustrating a method 200 of processing JDF job tickets in printing system 120 in an exemplary embodiment of the invention. The steps of method 200 will be described with reference to printing system 120 in FIG. 1, although method 200 may be performed by other systems. The steps of the flow chart in FIG. 2 are not all inclusive and may include other steps not shown.

In step 202, storage system 132 receives one or more printable files, and stores the files. The printable files may be received from host system 110 as illustrated in FIG. 1, or may be received from another system or server. In step 204, JDF interpreter 134 receives a JDF job ticket from host system 110 or another system. The JDF job ticket is associated with one or more printable files stored in storage system 132. In step 206, JDF interpreter 134 parses the JDF job ticket to identify printing parameters defined for one or more of the printable files. Printing parameters comprise any data, commands, instructions, values, etc, that control how a file is printed. For example, the printing parameters may indicate how many copies to print, may indicate that n-up printing is invoked, may indicate that printed sheets are to be stapled, etc.

The JDF job ticket, as presently defined for JDF by CIP4, is written in XML. XML code includes elements, attributes, tags, etc, that are generally referred to herein as XML statements. To identify the printing parameters in the JDF job ticket, JDF interpreter 134 parses the XML statements of the JDF job ticket to identify JDF attributes, which are essentially names for the printing parameters as written in XML. One or more printing utilities are pre-installed on print controller 122 which define particular procedures for the JDF attributes. For example, if one of the JDF attributes identified in the JDF job ticket is "setduplex=true", then the printing utilities will each have a procedure for "setduplex=true". The procedure in a printing utility is comprised of one or more device-specific device control commands in the appropriate PDL. Thus, if the JDF attribute is identified, then JDF interpreter 134 is able to identify the device control commands for the JDF attribute.

In step 208, JDF interpreter 134 issues device control commands for the printing parameters in the JDF job ticket to control printing of the printable file. In controlling the printing of the file, JDF interpreter 134 may issue device control commands which control many different components in printing system 120. For example, JDF interpreter 134 may issue device control commands which control how the pages of the file are arranged into sheetsides, how the sheetsides are rendered into sheetside bitmaps, or other processing steps that are performed within print controller 122. JDF interpreter 134 may also issue device control commands which control how input devices, finishing devices, and output devices operate, which are illustrated in FIG. 3.

Figure 3:
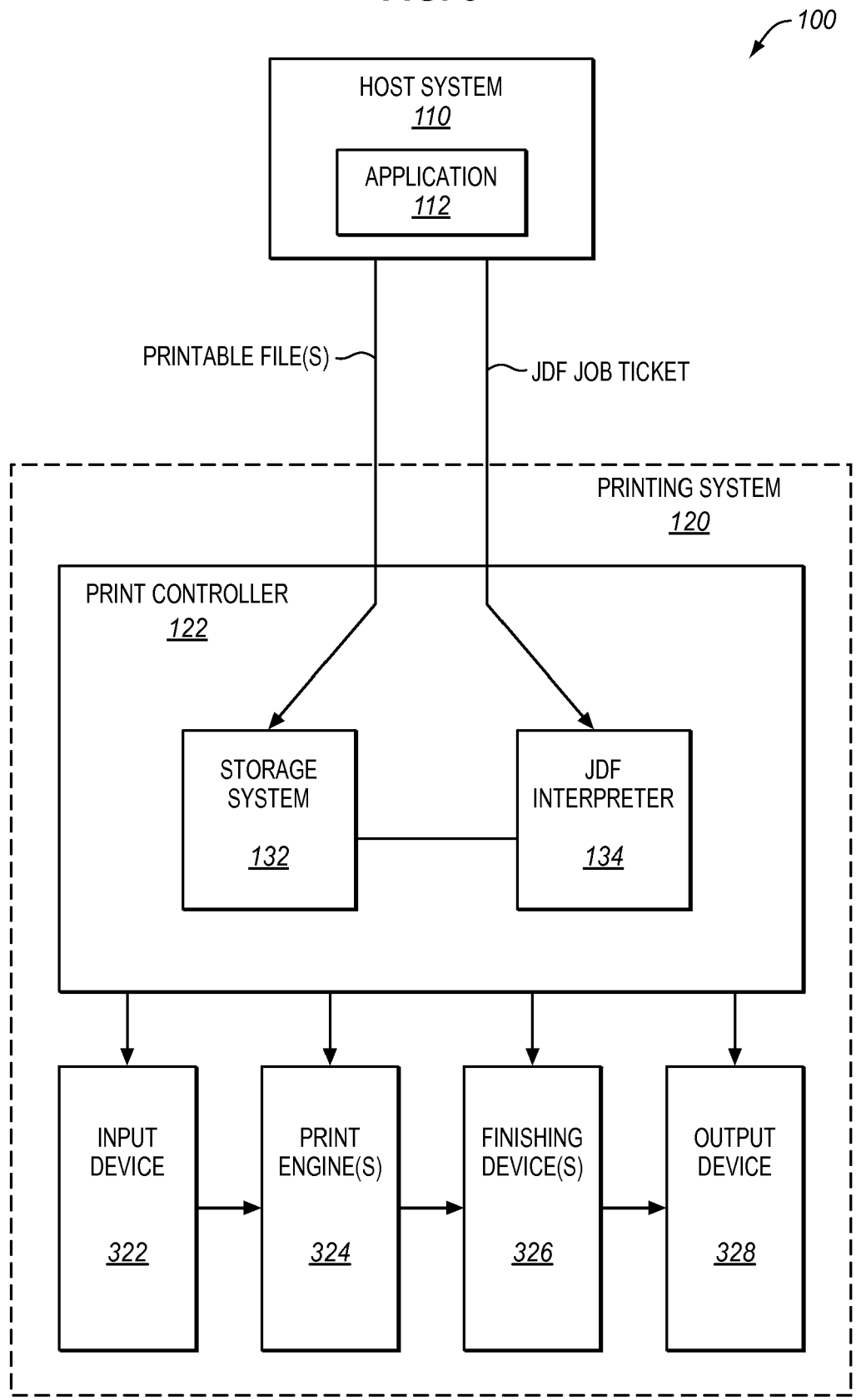
FIG. 3 illustrates a more detailed example of a printing environment in an exemplary embodiment of the invention.

FIG. 3 illustrates a more detailed example of printing environment 100 in an exemplary embodiment of the invention. In FIG. 3, printing system 120 further includes an input device 322, one or more print engines 324, one or more finishing devices 326, and an output device 328. Input device 322 is operable to store one or more types of printable medium (e.g., paper). For example, input device 322 may comprise a tray on a printer that stores a certain type of paper. Print engine 324 is operable to perform an imaging process to mark the printable medium supplied by input device 322 to generate printed sheets. Finishing device 326 is operable to perform one or more finishing processes on the printed sheets to generate finished printed sheets. For example, the finishing processes may be stapling, cutting, trimming, folding, hole punching, etc. Output device 328 is operable to output the finished printed sheets to a particular tray or other desired location. Printing system 120 may include other components or systems not shown for the sake of brevity.

The following provides some examples of how JDF interpreter 134 parses the JDF job ticket to identify printing parameters, and issues device control commands in steps 206 and 208 of FIG. 2. In one example, JDF interpreter 134 parses the JDF job ticket to identify layout parameters defined in the JDF job ticket. The layout parameters indicate how pages of the printable file are to be positioned on a sheetside. For example, the layout parameters may indicate if there is one-sided printing, two-sided printing, 1-up printing, 2-up printing, n-up printing, etc. JDF interpreter 134 then issues device control commands associated with the layout parameters which control the layout of pages of the printable file on sheetsides.

In another example, JDF interpreter 134 parses the JDF job ticket to identify rendering parameters defined in the JDF job ticket. The rendering parameters indicate how pages of the printable file are rendered from raw data to bitmaps. For example, the rendering parameters may indicate the resolution of the bitmaps, the color space for the bitmaps, etc. JDF interpreter 134 then issues device control commands associated with the rendering parameters which control the rendering of pages of the printable file into bitmaps.

In another example, JDF interpreter 134 parses the JDF job ticket to identify input media parameters defined in the JDF job ticket. The input media parameters indicate what type of printable medium will be used for the file or for a particular page of the file. For example, the input media parameters may indicate that 8½×11 paper having a weight of 24 lbs and a brightness of 96 GE is desired for this file. JDF interpreter 134 then issues device control commands associated with the input media parameters which control input device 322 to supply the printable medium indicated in the input media parameters to print engine 324. Print engine 324 may then perform an imaging process to image bitmaps on the printable medium to generate printed sheets.

In another example, JDF interpreter 134 parses the JDF job ticket to identify finishing parameters defined in the JDF job ticket. The finishing parameters indicate what type of finishing process(es) will be used for some or all of the printed sheets for the file. For example, the finishing parameters may indicate that the printed sheets for the file are to be stapled in the upper-left corner. JDF interpreter 134 then issues device control commands associated with the finishing parameters which control finishing device 326 to perform the finishing process(es) on the printed sheets to generate finished printed sheets.

In another example, JDF interpreter 134 parses the JDF job ticket to identify output parameters defined in the JDF job ticket. The output parameters indicate where to send the finished printed sheets for the file. For example, the output parameters may indicate that the finished printed sheets for the file are to be outputted to tray 2 of printing system 120. JDF interpreter 134 then issues device control commands associated with the output parameters which control output device 328 to output the finished printed sheets to a particular output tray or other location based on the output parameters.

Many print controllers include PostScript interpreters that are operable to interpret files and programs coded according to the PostScript language. The following illustrates a specific embodiment of implementing the JDF interpreter as a PostScript program. Although PostScript will be described in the following embodiment, other languages may be used to implement the JDF interpreter in other embodiments.

Figure 4:
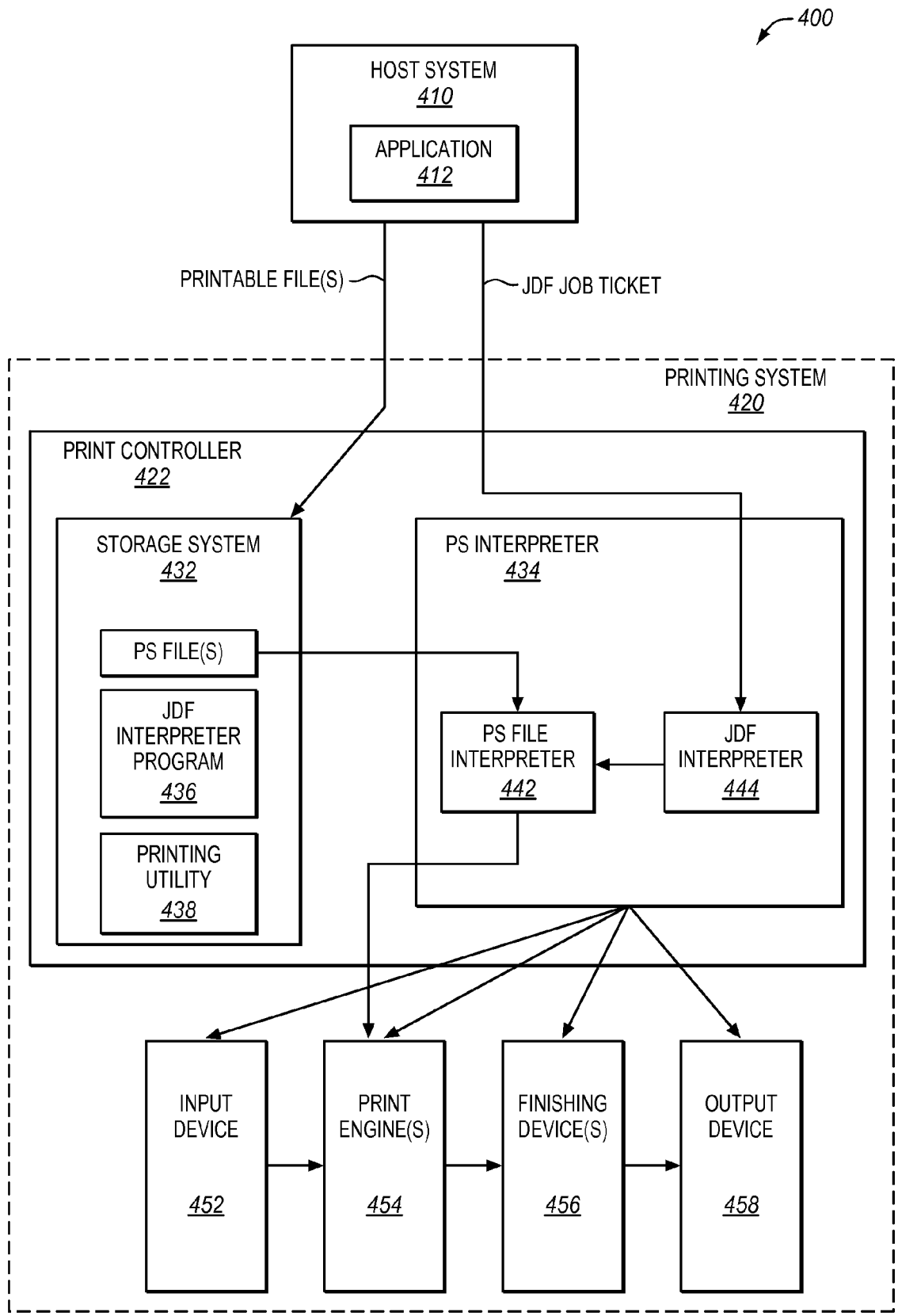
FIG. 4 illustrates another printing environment in an exemplary embodiment of the invention.

FIG. 4 illustrates another printing environment 400 in an exemplary embodiment of the invention. Printing environment 400 includes one or more host systems 410 in communication with a printing system 420. Host system 410 is able to execute an application 412 to generate or provide one or more PostScript files to printing system 420. Printing system 420 includes a print controller 422, an input device 452, one or more print engines 454, one or more finishing devices 456, and an output device 458. As in other embodiments, print controller 422 is operable to process JDF job tickets received from host system 410 or another system. To provide such functionality, print controller 422 includes a storage system 432 and a PostScript interpreter 434. A PostScript interpreter comprises any system, server, or components operable to translate or decode PostScript statements into executable form and execute the statements. PostScript interpreter 434 may be implemented as one or more processors executing instructions to perform the functionalities of an interpreter.

In this embodiment, storage system 432, or another memory in print controller 422, stores a JDF interpreter program 436. JDF interpreter program 436 is written in the PostScript language. Because JDF interpreter program 436 is written in PostScript language, PostScript interpreter 434 is able to interpret JDF interpreter program 436 as it would other PostScript programs or files. PostScript interpreter 434 is illustrated in FIG. 4 as including JDF interpreter 444 and PostScript file interpreter 442. JDF interpreter 444 represents the functions or actions performed by PostScript interpreter 434 when interpreting JDF interpreter program 436. PostScript file interpreter 442 represents the functions or actions performed by PostScript interpreter 434 when interpreting PostScript files to be printed as stored in storage system 432.

Storage system 432 also stores a printing utility 438 for PostScript. The printing utility comprises a plurality of PostScript procedures that correspond with printing parameters that are defined in JDF job tickets. For instance, if the JDF job tickets have a printing parameter "setduplex=true", then printing utility 438 includes a PostScript procedure defined for "setduplex=true". The PostScript procedures each comprise one or more PostScript commands for performing functions, such as duplex printing.

Figure 5:
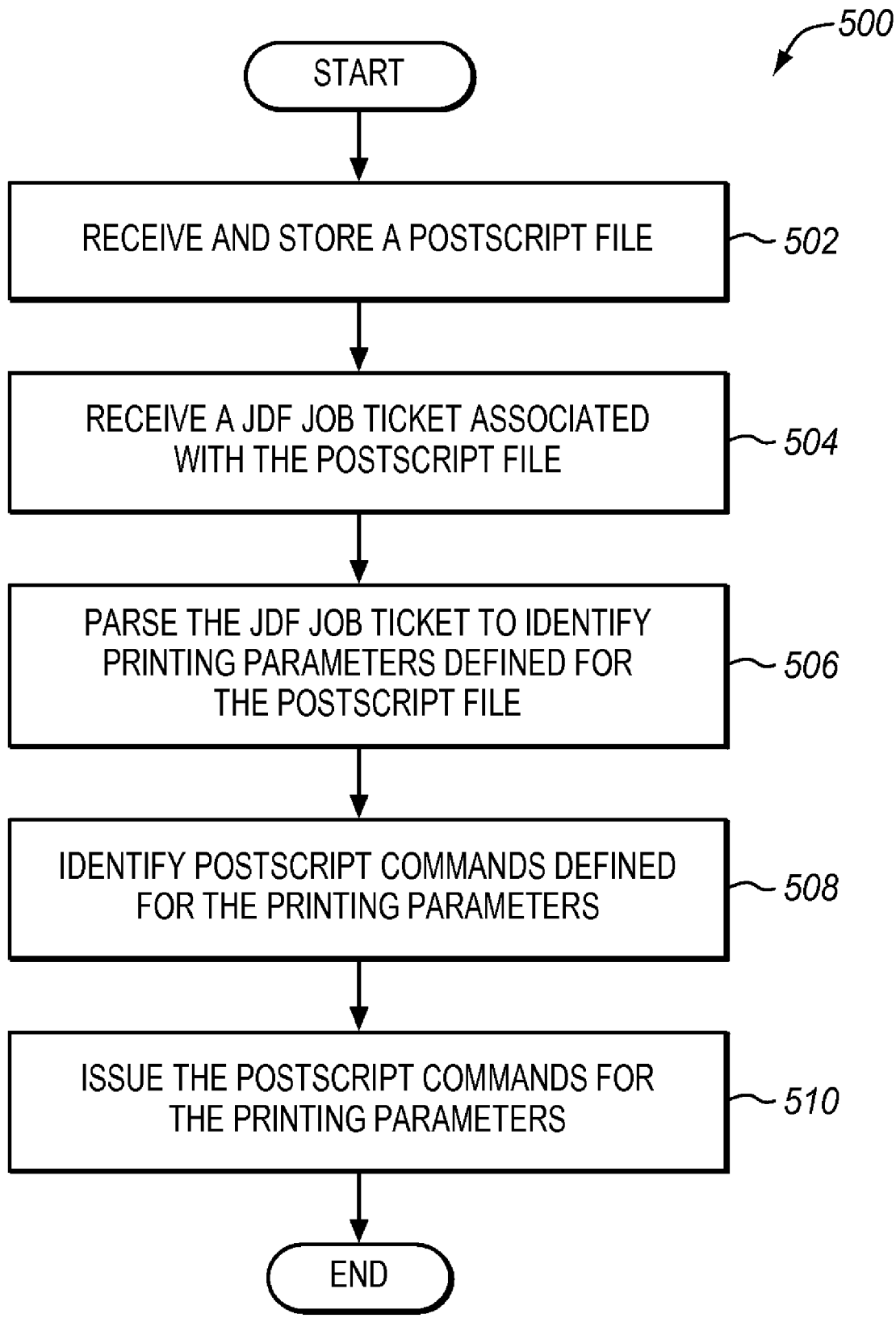
FIG. 5 is a flow chart illustrating another method of processing JDF job tickets in a printing system in an exemplary embodiment of the invention.

FIG. 5 is a flow chart illustrating a method 500 of processing JDF job tickets in print system 420 in an exemplary embodiment of the invention. The steps of method 500 will be described with reference to printing system 420 in FIG. 4, although method 500 may be performed by other systems.

The steps of the flow chart in FIG. 5 are not all inclusive and may include other steps not shown.

In step 502, storage system 432 receives one or more PostScript files, and stores the files. The PostScript files may be received from host system 410 as illustrated in FIG. 4, or may be received from another system or server. At some point, one or more of the PostScript files are retrieved from storage system 432, and are sent to PostScript interpreter 434 for processing.

In step 504, JDF interpreter 444 receives a JDF job ticket from host system 410 or another system. The JDF job ticket is associated with one or more printable files stored in storage system 432. As previously mentioned, the JDF job ticket is written in XML format. In step 506, JDF interpreter 444 parses the JDF job ticket to identify printing parameters (also referred to as JDF attributes) defined for the PostScript file. In step 508, JDF interpreter 444 identifies PostScript commands defined for the printing parameters. When a printing parameter is identified, JDF interpreter 444 identifies the corresponding PostScript procedure from printing utility 438 that is defined for that printing parameter. For example, if the printing parameter comprises "setduplex=true", then JDF interpreter 444 identifies the PostScript procedure defined for "setduplex=true". When the appropriate PostScript procedure is identified, then JDF interpreter 444 is able to identify the PostScript commands defined for the procedure.

In step 510, JDF interpreter 444 issues the PostScript commands for the printing parameters. To issue the PostScript commands, JDF interpreter 444 transmits the PostScript commands to the PostScript file interpreter 442, which is able to interpret the PostScript commands to perform the desired functions. PostScript file interpreter 442 then interprets the PostScript file and the PostScript commands from JDF interpreter 444 to print the PostScript file.

The PostScript commands may control various aspects of the printing process. For example, the PostScript commands may control layout of pages in the PostScript file, or may control how the pages of the PostScript file are rendered. The PostScript commands may define an input media for the PostScript file, finishing parameters that define what type of finishing process(es) will be used for some or all of the printed sheets for the PostScript file, or how the printed sheets are outputted.

By implementing the JDF interpreter 444 in the print controller 422, host system 410 can send a generic PostScript file and a JDF job ticket to printing system 420. The PostScript file does not have to be a device specific file, but can be device independent. Print controller 422 may then process the JDF job ticket to identify the printing parameters for this PostScript file, and also identify the device-specific PostScript commands for the printing parameters. The PostScript file may then be printed according to the device-specific PostScript commands.

Figure 6:
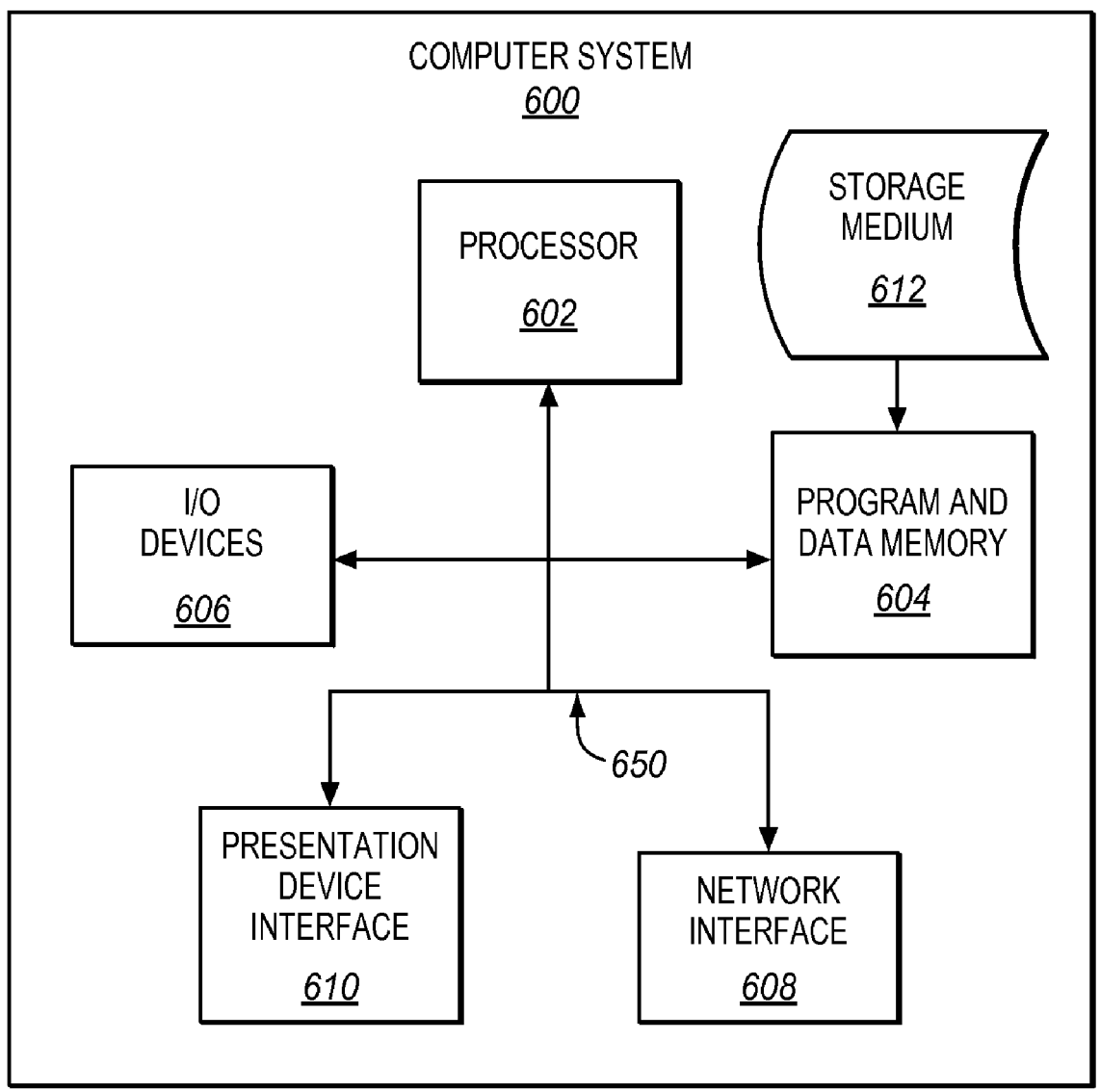
FIG. 6 illustrates a computer system operable to execute computer readable medium embodying programmed instructions to perform desired functions in an exemplary embodiment of the invention.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 is a block diagram depicting a computer system 600 adapted to provide features and aspects hereof by executing programmed instructions and accessing data stored on a computer readable storage medium 612.

Furthermore, embodiments of the invention can take the form of a computer program product accessible from a computer-usable or computer-readable medium 612 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer system 600 suitable for storing and/or executing program code will include at least one processor 602 coupled directly or indirectly to memory elements 604 through a system bus 650. The memory elements 604 can include local memory employed during actual execution of the program code, bulk storage, and cache memories which provide temporary storage of at least some program code in order to reduce the number of times code must be retrieved from bulk storage during execution.

Input/output or I/O devices 606 (including but not limited to keyboards, displays, pointing devices, etc) can be coupled to the system either directly or through intervening I/O controllers. Network adapter interfaces 608 may also be coupled to the system to enable the computer system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 610 may be coupled to the system to interface to one or more presentation device such as printing systems and displays for presentation of presentation data generated by processor 602.

Although specific embodiments were described herein, the scope of the invention is not limited to those specific embodiments. The scope of the invention is defined by the following claims and any equivalents thereof.

I claim:

1. A system comprising:
   a print controller of a printing system, the print controller comprising:
   a storage system operable to receive a printable file and a Job Definition Format (JDF) job ticket associated with the printable file from a host system, and to store the printable file and the JDF job ticket; and
   a JDF interpreter operable to receive the JDF job ticket from the storage system, to parse the JDF job ticket to identify printing parameters defined for the printable file, and to issue device control commands for the printing parameters in the JDF job ticket to control the printing of the printable file by the printing system.

2. The system of claim 1 wherein:
   the JDF interpreter of the print controller is further operable to identify layout parameters defined in the JDF job ticket, and to issue device control commands associated with the layout parameters which control the layout of pages of the printable file.

3. The system of claim 1 wherein:
   the JDF interpreter of the print controller is further operable to identify rendering parameters defined in the JDF job ticket, and to issue device control commands associated with the rendering parameters which control the rendering of pages of the printable file into bitmaps.

4. The system of claim 1 wherein:
the JDF interpreter of the print controller is further operable to identify input media parameters defined in the JDF job ticket, and to issue device control commands associated with the input media parameters which control an input device to supply a printable medium to a print engine for imaging of bitmaps on the printable medium to generate printed sheets.

5. The system of claim 1 wherein:
the JDF interpreter of the print controller is further operable to identify finishing parameters defined in the JDF job ticket, and to issue device control commands associated with the finishing parameters which control at least one finishing device to perform at least one finishing process on printed sheets to generate finished printed sheets.

6. The system of claim 1 wherein:
the JDF interpreter of the print controller is further operable to identify output parameters defined in the JDF job ticket, and to issue device control commands associated with the output parameters which control the output of finished printed sheets to an output tray.

7. A method of processing Job Definition Format (JDF) job tickets in a print controller of a printing system, the method comprising:
receiving, by the print controller of the printing system, a printable file from a host system, and storing the printable file;
receiving, by the print controller of the printing system, a JDF job ticket that is associated with the printable file from the host system, and storing the JDF job ticket;
parsing, by the print controller of the printing system, the JDF job ticket to identify printing parameters defined for the printable file; and
issuing, by the print controller of the printing system, device control commands for the printing parameters in the JDF job ticket to control the printing of the printable file by the printing system.

8. The method of claim 7 wherein parsing the JDF job ticket to identify printing parameters and issuing device control commands further comprises:
identifying layout parameters defined in the JDF job ticket; and
issuing device control commands associated with the layout parameters which control the layout of pages of the printable file.

9. The method of claim 7 wherein parsing the JDF job ticket to identify printing parameters and issuing device control commands further comprises:
identifying rendering parameters defined in the JDF job ticket; and
issuing device control commands associated with the rendering parameters which control the rendering of pages of the printable file into bitmaps.

10. The method of claim 7 wherein parsing the JDF job ticket to identify printing parameters and issuing device control commands further comprises:
identifying input media parameters defined in the JDF job ticket; and
issuing device control commands associated with the input media parameters which control an input device to supply a printable medium to a print engine for imaging of bitmaps on the printable medium to generate printed sheets.

11. The method of claim 7 wherein parsing the JDF job ticket to identify printing parameters and issuing device control commands further comprises:
identifying finishing parameters defined in the JDF job ticket; and
issuing device control commands associated with the finishing parameters which control at least one finishing device to perform at least one finishing process on printed sheets to generate finished printed sheets.

12. The method of claim 7 wherein parsing the JDF job ticket to identify printing parameters and issuing device control commands further comprises:
identifying output parameters defined in the JDF job ticket; and
issuing device control commands associated with the output parameters which control the output of finished printed sheets to an output tray.

13. A computer readable medium tangibly embodying programmed instructions which, when executed by a print controller of a printing system, are operable to process Job Definition Format (JDF) job tickets in the printing system, the method comprising:
receiving, by the print controller of the printing system, a printable file from a host system, and storing the printable file;
receiving, by the print controller of the printing system, a JDF job ticket that is associated with the printable file from the host system;
parsing, by the print controller of the printing system, the JDF job ticket to identify printing parameters defined for the printable file; and
issuing, by the print controller of the printing system, device control commands for the printing parameters in the JDF job ticket to control the printing of the printable file by the printing system.

14. A print controller for a printing system, the print controller comprising:
a storage system operable to receive a PostScript file from a host system, to store the PostScript file, and to store a JDF interpreter program written in PostScript language; and
a PostScript interpreter operable to interpret the JDF interpreter program to implement a JDF interpreter, the JDF interpreter operable to receive a Job Definition Format (JDF) job ticket that is associated with the PostScript file from the host system, to parse the JDF job ticket to identify printing parameters defined for the PostScript file, to identify PostScript commands defined for the printing parameters, and to issue the PostScript commands for the printing parameters to control the printing of the PostScript file on the printing system.

15. The print controller of claim 14 wherein:
the JDF interpreter is further operable to identify layout parameters defined in the JDF job ticket, and to issue PostScript commands associated with the layout parameters which control the layout of pages of the PostScript file.

16. The print controller of claim 14 wherein:
the JDF interpreter is further operable to identify rendering parameters defined in the JDF job ticket, and to issue PostScript commands associated with the rendering parameters which control the rendering of pages of the PostScript file into bitmaps.

17. The print controller of claim 14 wherein:
the JDF interpreter is further operable to identify input media parameters defined in the JDF job ticket, and to issue PostScript commands associated with the input media parameters which control an input device to supply a printable medium to a print engine for imaging of bitmaps on the printable medium to generate printed sheets.

18. The print controller of claim 14 wherein:
the JDF interpreter is further operable to identify finishing parameters defined in the JDF job ticket, and to issue PostScript commands associated with the finishing parameters which control at least one finishing device to perform at least one finishing process on printed sheets to generate finished printed sheets.

19. The print controller of claim 14 wherein:
the JDF interpreter is further operable to identify output parameters defined in the JDF job ticket, and to issue PostScript commands associated with the output parameters which control the output of finished printed sheets to an output tray based on the output parameters.

20. A method of processing Job Definition Format (JDF) job tickets in a printing system, the method comprising:
receiving a PostScript file from a host system, and storing the PostScript file;
receiving a JDF interpreter program written in PostScript language, and storing the JDF interpreter program; and
executing the JDF interpreter program in a PostScript interpreter in the printing system to perform the steps of:
receiving a JDF job ticket that is associated with the PostScript file from the host system;
parsing the JDF job ticket to identify printing parameters defined for the PostScript file;
identifying PostScript commands defined for the printing parameters; and
issuing the PostScript commands for the printing parameters to control the printing of the PostScript file on the printing system.

21. The method of claim 20 further comprising:
identifying layout parameters defined in the JDF job ticket; and
issuing PostScript commands associated with the layout parameters which control the layout of pages of the printable file.

22. The method of claim 20 further comprising:
identifying rendering parameters defined in the JDF job ticket; and
issuing PostScript commands associated with the rendering parameters which control the rendering of pages of the printable file into bitmaps.

23. The method of claim 20 further comprising:
identifying input media parameters defined in the JDF job ticket; and
issuing PostScript commands associated with the input media parameters which control an input device to supply a printable medium to a print engine for imaging of bitmaps on the printable medium to generate printed sheets.

24. The method of claim 20 further comprising:
identifying finishing parameters defined in the JDF job ticket; and
issuing PostScript commands associated with the finishing parameters which control at least one finishing device to perform at least one finishing process on printed sheets to generate finished printed sheets.

25. The method of claim 20 further comprising:
identifying output parameters defined in the JDF job ticket; and
issuing PostScript commands associated with the output parameters which control the output of finished printed sheets to an output tray.

\* \* \* \* \*